United States Patent [19]
Iung

[11] 3,898,853
[45] Aug. 12, 1975

[54] METHOD AND DEVICE FOR SUPPLYING GAS UNDER PRESSURE FROM A STORAGE TANK CONTAINING THE SAID GAS IN LIQUEFIED STATE

[75] Inventor: Jacques Iung, Pontarlier, France
[73] Assignee: Gurtner, S.A., France
[22] Filed: May 29, 1973
[21] Appl. No.: 364,739

[30] Foreign Application Priority Data
June 1, 1972 France .............................. 72.19733
Mar. 5, 1973 France .............................. 73.07756

[52] U.S. Cl. .................................. 62/55; 137/210
[51] Int. Cl. ............................................. F17c 17/02
[58] Field of Search ............ 62/50, 51, 55; 137/486, 137/487, 487.5, 210, 211

[56] References Cited
UNITED STATES PATENTS
3,062,017  11/1962  Balcar et al.............................. 62/50
3,262,280  7/1966  Chaney............................... 62/55 X
3,271,966  9/1966  Webb................................... 62/50 X
3,605,424  9/1971  Paine .................................. 62/55 X

*Primary Examiner*—William F. O'Dea
*Assistant Examiner*—Ronald C. Capossela
*Attorney, Agent, or Firm*—Steinberg & Blake

[57] ABSTRACT

Method and device for supplying a liquefied gas to a point of distribution of gas under pressure. A petroleum liquefied gas contained in a tank is allowed to flow into a container having a reduced volume, while the return of the liquid from the container towards the tank is prevented and the liquid contained in the container is caused to flow from said container to the point of distribution by letting the pressure in the container rise by effecting a partial gasification of the liquid in said container.

16 Claims, 7 Drawing Figures

PATENTED AUG 12 1975

3,898,853

SHEET 1

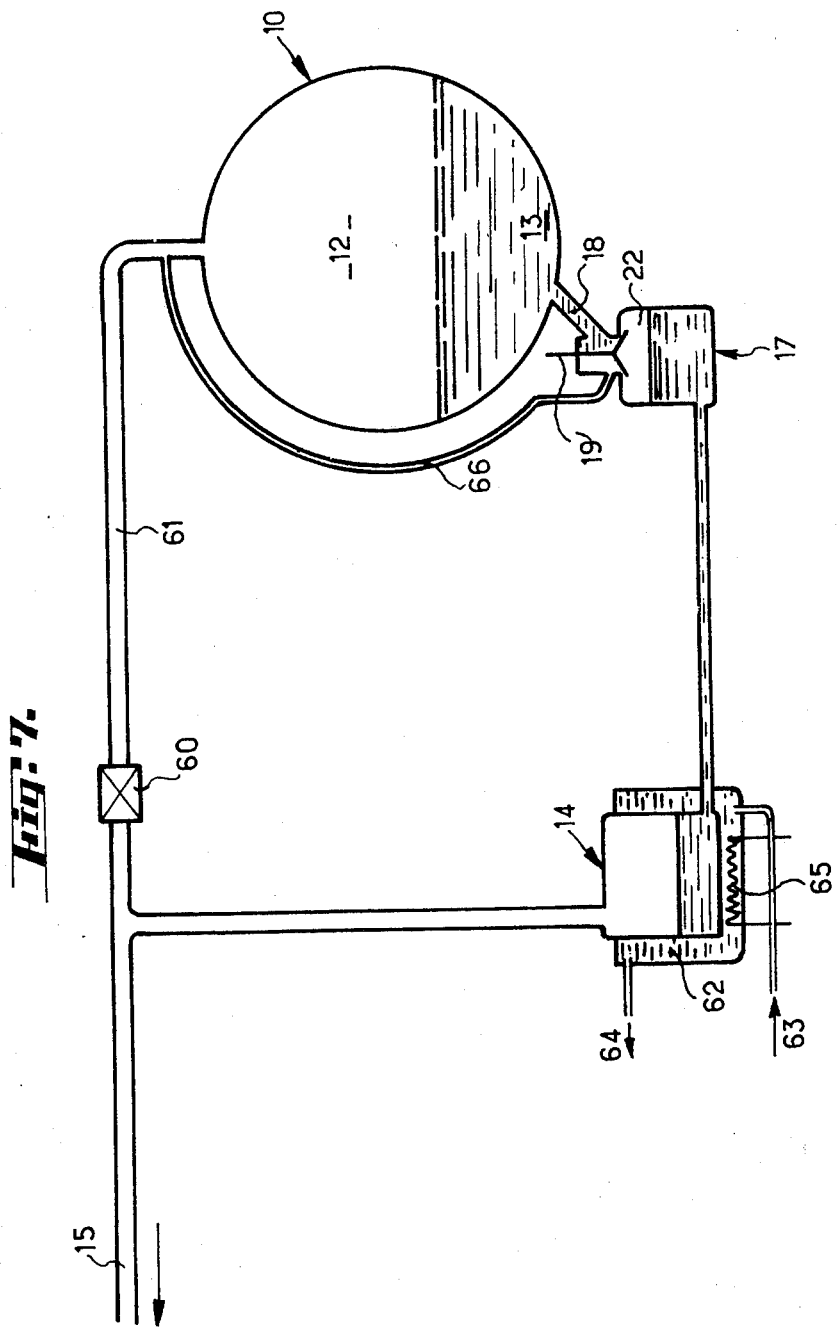

METHOD AND DEVICE FOR SUPPLYING GAS UNDER PRESSURE FROM A STORAGE TANK CONTAINING THE SAID GAS IN LIQUEFIED STATE

The present invention has essentially for its object a method and device for supplying a liquid constituted by a liquefied gas to a point of distribution of gas under pressure. More particularly, the said liquefied gas may be petroleum gas, butane or propane, contained in particular in a storage tank filled at least partially with the said liquid.

The storage of gas in liquid form permits the formation of important reserves of gas stored in a relatively small volume. For example, in order to supply a gas distribution network, it is necessary to pump from the tank a small amount of liquefied gas and to convey it into a gasifying or vapourizing apparatus in which the liquid-gas transformation takes place with pressure reduction if needed. The said apparatus may be constituted for example by a heat exchanger which is supplied with the heat necessary for the liquid-gas phase change.

No satisfactory pumping equipment is known in the art. Conventional volume pumps, gear pumps, piston pumps, membrane pumps and so forth, where used, are little suitable, relatively expensive and not very reliable in operation.

In particular, there exists no apparatus well suited for the withdrawal, from a butane or propane tank, of liquefied gas intended to be supplied, according to needs, to various household appliances such as water-heaters, central-heating boilers, vehicles, stationary engines and so forth.

To solve these problems, the invention provides a novel supply method in which the liquid contained in the tank is allowed to flow into a container having a comparatively very reduced volume, while at the same time preventing the return of the liquid from the container towards the tank, the liquid contained in the container is caused to flow from the said container to the said point of distribution while at the same time preventing the return of the liquid from the said point towards the said container, the pressure in the said container is allowed to rise so as to expel the liquid contained therein towards the said point of distribution by effecting a partial gasification of the liquid in the said container, and, when the level of the liquid in the said container lowers below a certain level, a withdrawal of the gaseous phase contained in the said container is performed to permit a further introduction of liquid proceeding from the said tank. Owing to this method, no use is made of any mechanical devices such as a gear pump, piston pump, membrane pump or the like. Therefore, it is a method using static means and operating intermittently according to a recurrent cycle.

Advantageously, the withdrawal of the gaseous phase contained in the container at the end of the discharge cycle from the said container to the said point of distribution takes place towards the tank so as to equalize the pressures between the tank and the container. The subsequent re-filling of the container with liquefied gas can thus take place simply by gravity, and a further cycle starts.

The device for carrying out the method according to the invention comprises a container having a relatively small volume and communicating with the tank through a unidirectional system such as a non-return valve permitting the flow of the liquid contained in the tank towards the said container and preventing the reverse passage of the liquid from the container to the tank, a unidirectional system such as a non-return valve permitting the flow of the liquid contained in the container to the said point of distribution and preventing the reverse passage of the liquid from the point of distribution to the container, means of detection of the liquid level in the container, means controlled by the said detection means and permitting the withdrawal of the gaseous phase contained in the container when the liquid level lowers below a predetermined level, and means of heating the liquid contained in the said container.

Advantageously, the said means of withdrawal of the gaseous phase from the said container comprise a duct connecting the gaseous phase in the container to the tank and a valve mounted on the said duct and so controlled by the said level detection means as to be opened when the liquid level lowers below the said predetermined level.

Such a device therefore uses only very simple and highly reliable means such as non-return valves and a float-type detection system, while in every other respect the device operates automatically by way of simple gasification of a small proportion of the liquefied gas admitted into the container at each cycle.

If necessary, the gasification in the container can be accelerated by using heating means which can be operated only when required and for a cycle portion corresponding to a stage of vapourization and discharge of liquefied gas from the container towards the point of distribution.

The invention will be better understood and other objects, characteristics and advantages thereof will appear as the following description proceeds, with reference to the appended drawings given solely by way of example illustrating several forms of embodiment of the invention and wherein:

FIG. 7 is a diagrammatic view illustrating a particular arrangement of the supply device and the liquefied-gas vapourizing device.

Figure 1:
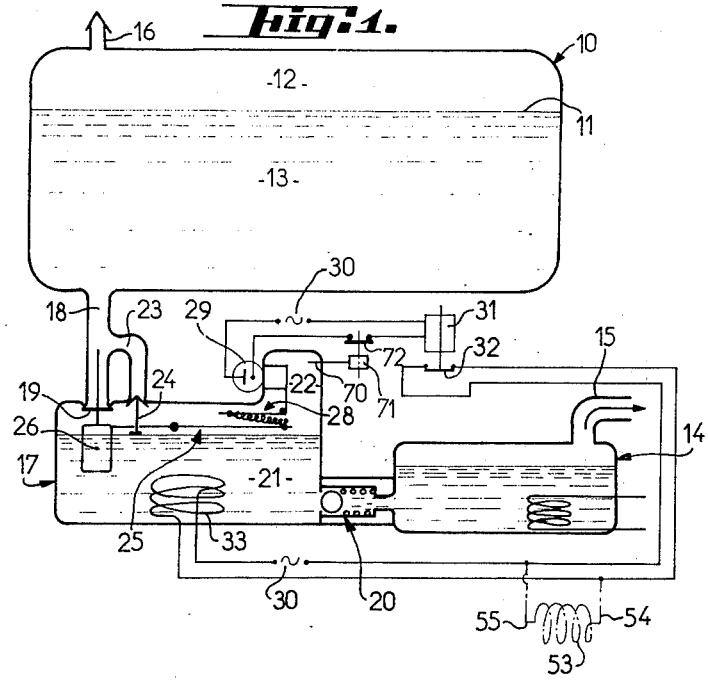
FIG. 1 is a diagrammatic general view of a liquefied petroleum-gas distribution plant using the method of the invention.

Reference is first made to FIG. 1, which illustrates diagrammatically a tank 10 containing liquefied gas, for instance liquefied butane, the level of which is shown at 11. The tank is normally maintained under the pressure of the gaseous phase 12, which is sufficient to discharge the liquefied butane located in the lower portion of the tank towards the point of distribution of the said liquefied gas, which, in the example illustrated, is constituted by the evaporating or vapourizing receiver 14 delivering butane gas under pressure into the distribution pipe 15 of the plant. The vapourizer 14 is of course diagrammatized and can be of any suitable type. On the tank 10 is provided a safety valve 16 which opens in case of unexpected overpressure in the tank.

According to the invention, below the level of the tank 10 is mounted a device for the supply of liquefied gas to the point of distribution 14 which comprises a container 17 communicating with the liquid phase 13 of the tank 10 through a duct 18 controlled by a unidirectional valve 19 permitting the passage of liquefied gas from the tank 10 to the container 17. Likewise, a non-return valve 20 permits the passage of the liquid phase 21 contained in the container 17 and its flow towards the vaporizer 14. The gaseous phase 22 of the container communicates with the the tank 10 through a duct 23 which is normally closed by a valve 24 which opens only when the level of liquid 21 in the container 17 lowers below a certain level.

A mechanism 25 including floats 26 enables the liquid level in the container 21 to be detected and the valve 24 to be actuated at the desired moment, as will be explained later.

Figure 3:
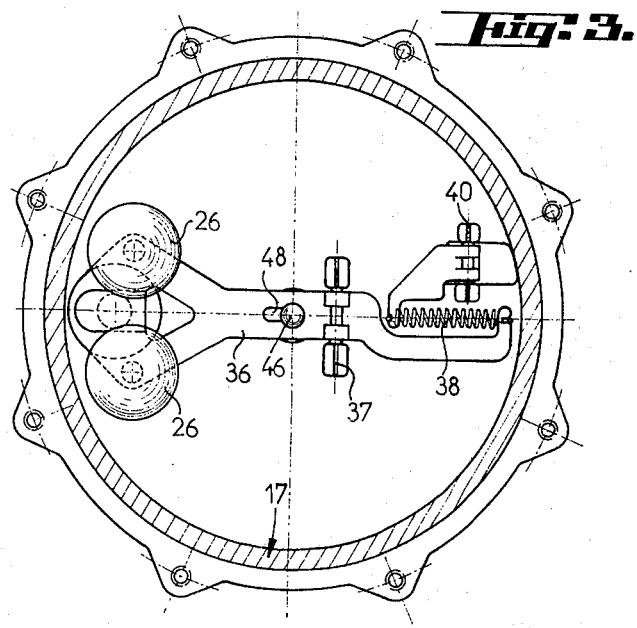
FIG. 3 is a horizontal sectional view substantially upon the broken line III—III of FIG. 2.
Figure 2:
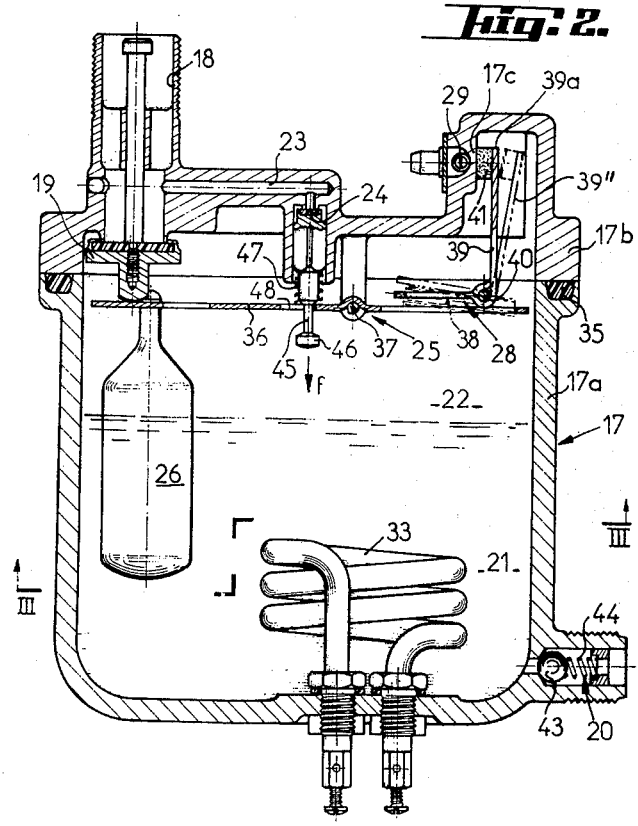
FIG. 2 is a vertical sectional view, to a larger scale, of a supply device according to the invention.

The mechanism 25 used in the system illustrated in FIG. 1 is shown more in detail in FIGS. 2 and 3. The mechanism 25, through the medium of a rocker system 28, opens or closes a magnetic contact 29 which is fed from an electric supply source 30 and controls a relay 31. The latter controls a contact 32 which switches on a heating resistor 33 supplied from the electric supply source 30.

Reference is now made more particularly to FIGS. 2 and 3.

The container 17 is formed of two parts, i.e. a bottom 17a and a cover 17b, the fluid-tightness between which is ensured by a seal 35. The liquefied gas, i.e. the liquid, flows by gravity from the tank 10 into the duct 18 and enters the container 17 when the valve 19 opens. This occurs when the floats are in lower position.

The lever-arm mechanism 25 comprises the floats 26, a lever-arm 36 and a stationary hinge pin 37 for the said lever. A mechanism 28 of a known type provided with a spring 38 actuates a bent lever 39 according to the position of the float or floats 26 in the container 17, so as to swing the said bent lever to a position shown in full lines in FIG. 2 when the float is in upper position, or to a position 39" shown in dotted lines in the same Figure when the float is in lower position. The bent lever 39 rotates about a stationary hinge pin 40 and carries at its end 39a a permanent magnet 41. In the position illustrated in FIG. 2 in full lines, when the magnet 41 is applied against the wall 17c of the cover 17b opposite the magnetic contact 29, the latter is closed, the relay 31 is fed and the heating resistor 33 is switched on, as can be understood from FIG. 1.

In the example illustrated, the non-return valve 20 permitting the passage of liquefied gas from the container 17 to the vaporizer 14 (point of distribution) is a valve of the type provided with a ball 43 which is normally maintained on its seat under the action of a spring 44.

The valve 24 connecting or disconnecting the gaseous phase 22 of the container 17 to or from the tank is solid with a rod 45, the lower end of which is provided with a head 46 larger in diameter. A spring 47 bearing upon the lever 36 normally maintains the valve 24 closed when the float is in upper position. When the floats 26 move downward, the lever 36 rotates about the hinge pin 37 and at the end of its travel drives the head 46 of the rod 45 in the direction of arrow $f$, thus opening the valve 24. In FIG. 3, the opening 48 through which the rod 46 of the valve 24 is passed appears more clearly.

Also in FIG. 3 is seen the symmetrical position of the two floats 26 on either side of lever 36 and the particular conformation of the said lever, which facilitates the positioning of the abruptly rocking mechanism 28.

The operation of the device just described is readily inferred from the foregoing.

While the tank 10 is under pressure, the liquid tends to flow normally and automatically from the tank 10 towards the container 17, and from the container 17 towards the point of distribution 14, owing to the arrangement of the valves 19 and 20 which tend to open to permit the passage of the liquefied gas in this direction.

If, owing to too high a demand downstream of the device and/or unfavourable meteorological conditions (low temperatures); there is a lack of pressure in the tank 10 and the evaporator 14 is supplied insufficiently, the supply device according to the invention operates as follows.

The container 17 fills with liquid 21 owing to the latter normally tending to fill it by gravity from the tank 10 and owing to the pressure in the container 17 being small, since otherwise the liquid 21 would be expelled towards the vapourizer 14 supplying the plant. When the level of liquid in the container 17 becomes sufficiently high, for example as shown in FIG. 2, the floats 26 driving the lever 36 actuate the quick-acting mechanism 28 to the position illustrated in solid lines in FIG. 2, wherein the magnet 41 is applied against the wall 17c opposite the magnetic contact 29. The latter closes, the relay 31 is fed and closes the contact 32, thus switching on the heating resistor 33. A vapourization of a small amount of liquefied gas then takes place in the container 17, thus increasing the pressure and therefore delivering the liquid phase 21 through the valve 20 towards the point of distribution.

When the level in the container 17 lowers below a certain value, e.g. substantially to the level of the resistor 33, the floats 26 move down simultaneously. At a certain moment the quick-acting system 28 swings, the magnetic contact 29 opens, the relay 31 is de-energized, the contact 32 opens and the supply to the heating resistor 33 is cut. A moment later, or simultaneously, the level of liquid 21 in the container 17 continuing to move down owing to the thermal inertia of the resistor 33 continuing to vapourize liquefied gas, the lever 36 drives the head 46 of rod 45 of the valve 24, thus opening the latter and equalizing the pressure of the gaseous phase 22 in the container 17 and the pressure in the tank 10. This pressure drop in the container 17 permits the opening of the valve 19 and further filling of the container 17 with liquid flowing by simple gravity from the tank 10 into the duct 18 through the valve 19. The container 17 again fills with liquid and a further operating cycle starts. A pressure measuring device provided in the tank 10 and/or the container 17 ensure automatic switching off of the heating resistor 33 as soon as the pressure thus detected exceeds a predetermined limit value. In FIG. 1 this device is shown to be constituted by a pressure contact 71 comprising a pressure detector 70 mounted on the container 17 and controlling a contact 72 in series with the magnetic contact 29.

Figure 6:
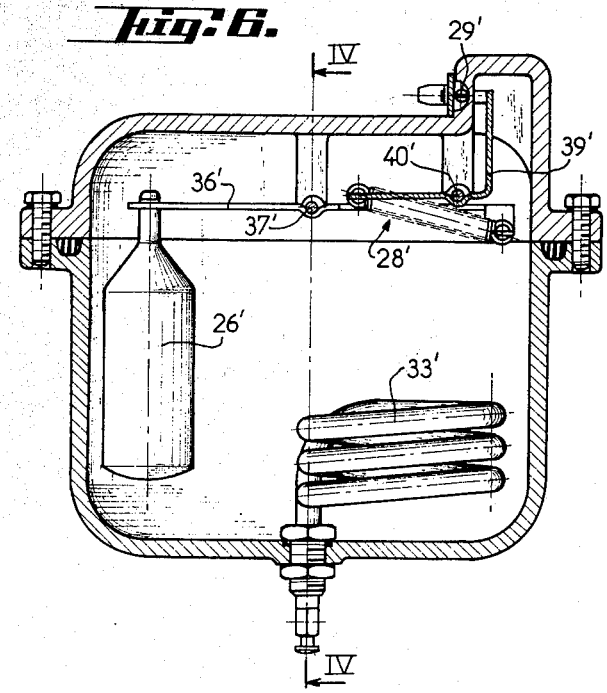
FIGS. 5 and 6 are sectional views substantially and respectively in the horizontal plane V—V of FIG. 4 and the vertical plane VI—VI of this same Figure.
Figure 4:
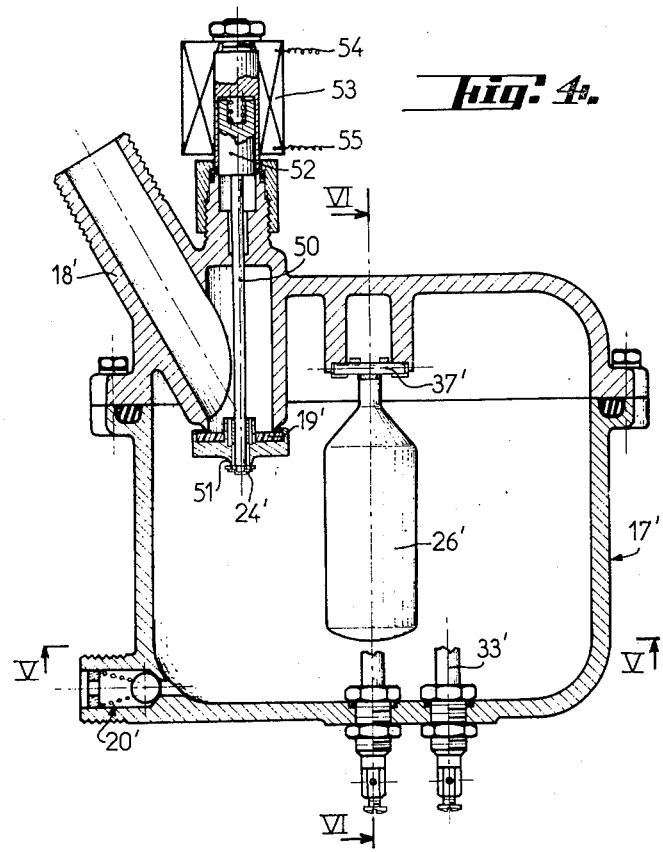
FIG. 4 is a view similar to that of FIG. 2, substantially upon the sectional plane IV—IV of FIG. 6, illustrating a modified form of embodiment.
Figure 5:
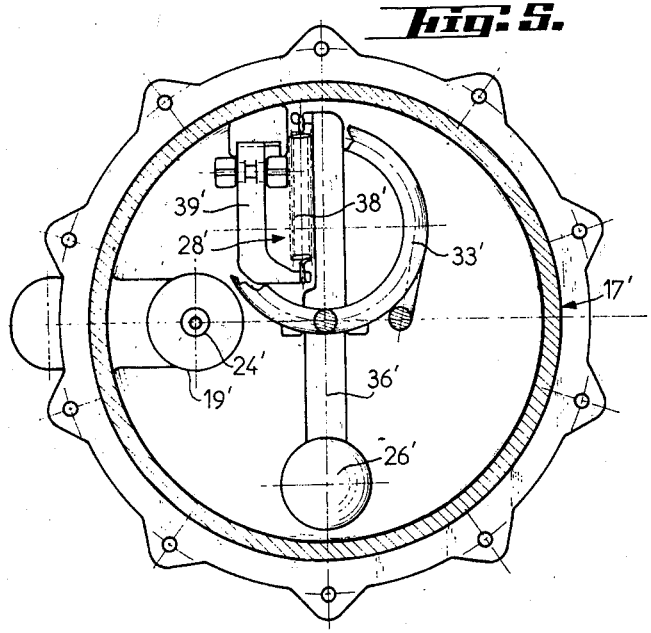

In the modified form of embodiment illustrated in FIGS. 4 through 6, wherein the same reference numerals with the sign (') are used to designate the elements similar to those of the form of embodiment just described, the essential difference is in the control of the valve 24' connecting the gaseous phase of the container 17' to the tank 10. The operation of the device in all other respects is the same and will not be described again.

Referring to FIGS. 4 through 6, it is seen that the valve 24' is mounted at the end of a control rod 50, the seat 51 of the valve 24' being formed at the centre of the valve 19'. The rod 50 controlling the valve 24' is solid with a plunger 52 adapted to be attracted by the coil 53 of an electromagnet.

The terminals 54, 55 of the electromagnet coil 53 are supplied in parallel with the heating resistor 33 when the magnetic contact 29 is closed and the relay 31 has closed the contact 32 as shown in dash-dotted lines in FIG. 1.

It is thus understood that the valve 24' is closed only when, owing to pressure lack in the tank 10, it is necessary to add heat in the containers 17' in order to deliver liquefied gas to the point of distribution. The closing of the valve 24' thus allows the pressure in the containers 17' to increase and the liquefied gas to be delivered to the point of distribution even if the pressure in the tank 10 is not sufficiently high. In normal time, when the pressure in the tank 10 is sufficient to ensure the supply of the vapourizer 14 through the valves 19', 20', the heating device 33' is not used and the pressures in the container 17' and the tank 10 are equalized as a result of the opening of valve 24'. In addition to control by means of a pressure-contact 71, the switching off of the heating device 33' may be achieved by a second pressure contact (not shown) controlling the pressure in the tank 10.

According to another modified form of embodiment illustrated in FIG. 7, the storage tank 10 containing liquefied gas with its liquid phase 13 and its gaseous phase 12 supplies a point of distribution or use 15 by means of a container 17 forming a thermal pump and of a vapourizer 14 as described hereinabove with reference to FIG. 1.

According to the form of embodiment now being described, when the non-return valve 19' used on the container 17 is closed, the tank 10 and the said container are completely disconnected from one another. When the said valve is opened, it interconnects the gaseous phases 22 of the container 17 and 12 of the tank 10 through the duct 66 and permits the flow of the liquid by gravity through the duct 18 from the tank into the container.

On the other hand, a non-return valve 60 mounted on a duct 61 connects the gaseous phase 12 of the tank to the distribution pipe 15 when the pressure in the tank is sufficient to overcome the non-return valve 60. Under such conditions it is obvious that if the pressure in the tank 10 is sufficient, the duct 61 provided with the non-return valve 60 by-passes the thermal pump 17 and the vapourizer 14.

At 62 is illustrated a heating system for the vapourizer 14 by hot water entering at 63 and leaving at 64. The said water proceeds from the consumer, e.g. a central-heating boiler or a sanitary hot-water supply boiler. At 65 is illustrated a heating resistor enabling the plant to be started as long as the hot-water heater of the vapourizer 14 cannot come into operation. Thus, once the plant is started, a highly reliable, low-cost and powerful operation of the whole plant is obtained.

Of course, a great number of modifications can be introduced into the form of embodiments just described. In particular, the non-return valve 60 mounted on the duct 61 may be replaced by a valve controlled by the pressure in the tank 10. Such a control may simultaneously serve to disconnect the thermal pump 17 and the vapourizer 14, for example by cutting off the heating circuit of the pump and vapourizer. As for the water heating circuit of the vapourizer 14, the regulation of this heating may be ensured, for example, by an electromagnetic valve mounted on the hot-water circuit 63, 64 supplying the jacket 62.

The use may also be contemplated of a control thermostat mounted on the tank 10 to control the valve 60 and/or the heating of the vapourizer and the thermal pump. These last two devices may also, in some cases, be assembled within the body of one and the same device.

Likewise, other control means for the valves may be provided, as well as various safety means. For example, the valves 24, 24' may be controlled by manometric, pneumatic or electromagnetic means with or without the use of an intermediate relay, instead of mechanical means as in the form of embodiment of FIGS. 2 and 3, or electromagnetic means as in the form of embodiment of FIGS. 4 through 6. The pressure may advantageously be tapped from the container 17, 17' or, if suitable, from the container or the distribution network.

Likewise, the level detection device may be different from the float type. Moreover, other control means for the closing of the magnetic contact 29 may be used instead of the quick-acting mechanism 28, 28'.

The invention therefore comprises all the means constituting technical equivalents to the means described as well as their combinations, should the latter be carried out according to the spirit of the invention.

What is claimed is:

1. Method for supplying a combustible liquid, such as, liquefied petroleumgas, from a storage tank filled at least partially with said liquid to a point of distribution of the gas under pressure, the said method comprising the steps of: allowing the liquid contained in the tank to flow by gravity into a container lower than said tank and of a comparatively very reduced capacity as compared to said tank, while at the same time preventing the return of the liquid from the container towards the tank; providing for the liquid contained in the container a path of flow from the said container towards the said point of distribution and withdrawing from said point of distribution as required gas derived from the liquid reaching said point of distribution from said container; increasing the pressure in said container when the liquid therein rises to a given upper level; to expel the liquid therefrom towards the point of distribution, by effecting a partial gasification of the liquid in the said container; and, when the liquid level in said container lowers below a given lower level, withdrawing the gaseous phase contained in the said container to permit further introduction of liquid into the said container from said tank.

2. Supply method according to claim 1, wherein the withdrawal of the gaseous phase contained in the said container is performed towards the tank so as to equalize the pressures in the tank and the container.

3. Supply method according to claim 1, wherein the gasification of the liquid in the container is achieved by way of heat supply, and wherein said heat supply is at a pressure rises above a predetermined value.

4. Supply method according to claim 1, wherein, when the pressure in the storage tank is above a given valve said container is by-passed and put out of action.

5. Supply method according to claim 1, wherein said distribution gas is used at least partially to heat a heating plant, and in order to achieve said partial gasification of the liquefied gas pumped into the container, use is made of heating by means of a circuit of fluid heated by said heating plant and an electric heating for the starting of the plant is furthermore provided.

6. In a system for supplying combustible gas from a liquefied gas, distributing means forming a point of distrubtion of the combustible gas under pressure to be supplied by vapourizing of a liquid constituted by liquefied gas, such as liquefied petroleum-gas, a storage tank filled at least partially with said liquid, a container of relatively small capacity as compared to said tank communicating with and situated at a lower elevation than said tank, a unidirectional system permitting the gravitational flow of the liquid contained in the tank towards the said container and preventing reverse passage from the container towards the tank, a system permitting the flow of the liquid contained in the container towards the said distribution means, means in said container for the detection of the liquid level therein, means controlled by the said detection means and permitting the withdrawal of the gaseous phase contained in the container when the liquid level lowers below a predetermined lower level and means controlled by said detection means for heating the liquid contained in said container when the liquid level therein rises to a predetermined upper level.

7. The combination according to claim 6, comprising pressure-control means for controlling the switching off of the said heating means when the pressure in the tank and in the container rises above a predetermined value.

8. The combination according to claim 6, wherein the said means for the withdrawal of gaseous phase from the said container comprises a duct connecting the gaseous phase in the container to the said tank and a valve mounted on the said duct and so controlled by the said level detection means as to be opened when the liquid level lowers below the said predetermined lower level.

9. The combination according to claim 8, wherein the said level detection means comprise a float and a lever-arm mechanism cooperating therewith.

10. The combination according to claim 9, including a quick-acting contact, wherein the said lever-arm mechanism controls the opening and closing of said quick-acting contact, magnetic contacts and associated relays controlled by said quick-acting contact and controlling the switching on and switching off of said heating means and the means for the withdrawal of the gaseous phase from the said container.

11. The combination according to claim 10, wherein the said lever-arm mechanism controls directly the opening of the means of withdrawal of the gaseous phase from the said container.

12. The combination according to claim 10, including an electromagnetic valve for controlling the withdrawal of the gaseous phase from said container, wherein the said quick-acting contact, a magnetic contact and an associated relay control said electromagnetic valve.

13. The combination according to claim 12, a valve operatively connected with and controlled by said electromagnetic valve and mounted axially with respect to the valve for the flow of the liquid from the tank into the container.

14. The combination according claim 6, comprising a duct connecting the gaseous phase of the container to that of the tank when the said unidirectional system permits the flow of the liquid contained in the tank towards the said container is opened, the said tank and container being completely disconnected from one another when the said valve is closed.

15. The combination according to claim 14, comprising a duct connecting the gaseous phase of the tank to the said means forming said point of distribution and having an obturating means, and means controlled by a fluid condition existing in the tank for actuating said obturating means so as to open said obturating means when the fluid condition in the tank exceeds a predetermined value, and for closing said obturating means when the fluid condition in the tank decreases below a predetermined value.

16. The combination according to claim 15, furthermore comprising a vapourizer for vapourizing the liquefied gas expelled from said container towards the point of distribution before being distributed, wherein said controlled means control simultaneously the vapourizer and container, the latter forming a pump, so as to put said container and vapourizer into action when the said obturating means are closed and out of action when the said obturating means are opened.

* * * * *